United States Patent [19]

Urban

[11] 3,728,433

[45] *Apr. 17, 1973

[54] CONTINUOUS PROCESS FOR SCRUBBING SULFUR DIOXIDE FROM A GAS STREAM

[75] Inventor: Peter Urban, Northbrook, Ill.

[73] Assignee: Universal Oil Products Company, Des Plaines, Ill.

[ * ] Notice: The portion of the term of this patent subsequent to Apr. 6, 1988, has been disclaimed.

[22] Filed: Mar. 26, 1971

[21] Appl. No.: 128,428

Related U.S. Application Data

[63] Continuation-in-part of Ser. No. 9,894, Feb. 9, 1970, Pat. No. 3,574,097.

[52] U.S. Cl. ................................423/242, 423/541
[51] Int. Cl. .............................................C01b 17/16
[58] Field of Search............................23/2, 181, 225; 210/61, 63

[56] References Cited

UNITED STATES PATENTS

3,574,097   2/1970   Urban..............................23/2 R X

*Primary Examiner*—Oscar R. Vertiz
*Assistant Examiner*—George O. Peters
*Attorney*—James R. Hoatson, Jr. and Thomas K. McBride

[57] ABSTRACT

An input gas stream containing $SO_2$ is continuously treated in order to remove a substantial portion of the $SO_2$ therefrom by the steps of: (a) scrubbing the input gas stream with an aqueous absorbent containing an alkaline reagent; (b) treating the resulting rich absorbent stream with a reducing agent at conditions selected to convert the sulfite compound contained therein to the corresponding thiosulfate compound; (c) reacting the resulting thiosulfate compound with carbon monixide at reduction conditions selected to produce the corresponding sulfide compound; (d) stripping hydrogan sulfide from the resulting solution to form a regenerated aqueous absorbent stream; and, thereafter, (e) passing at least a portion of the regenerated absorbent stream to the scrubbing step.

Figure 1:
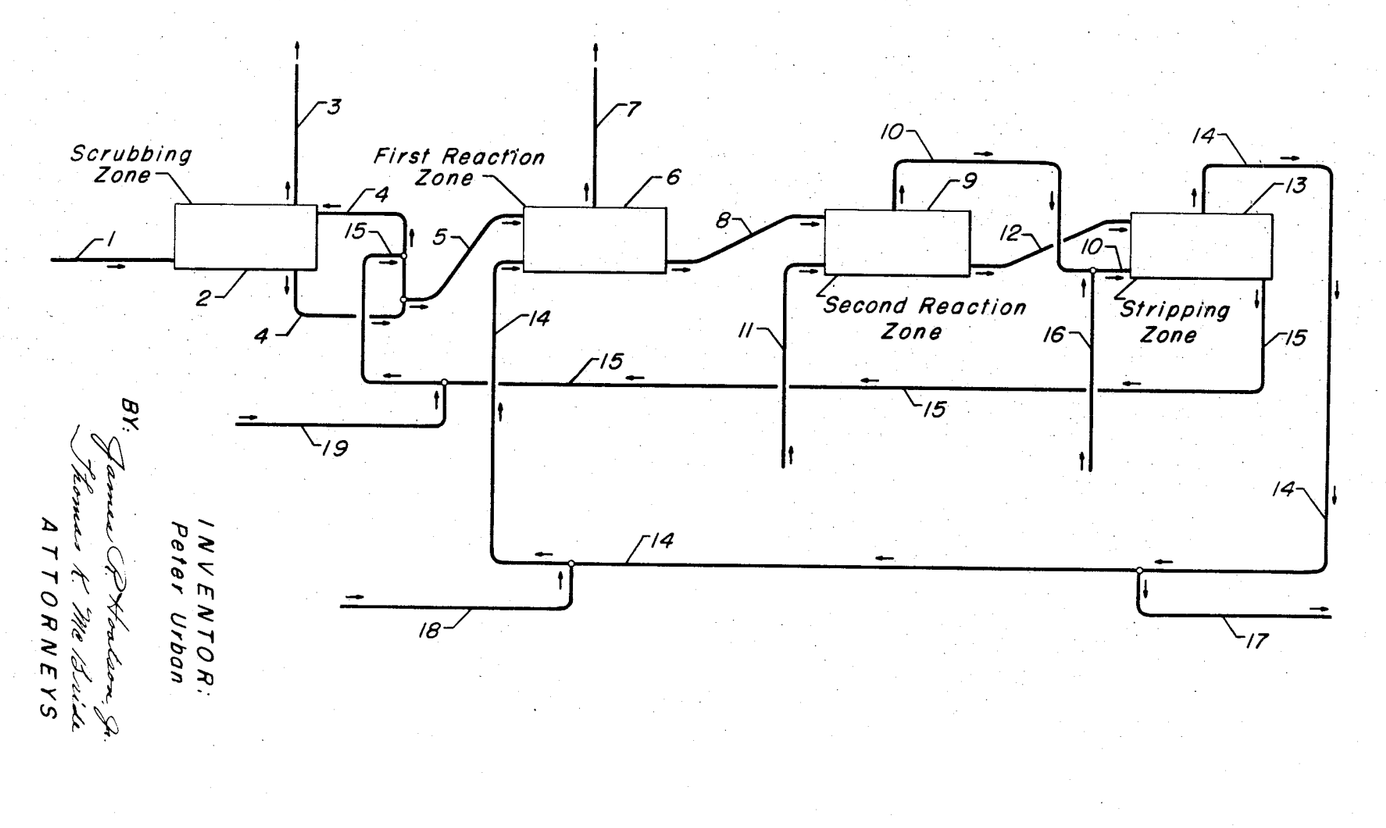

21 Claims, 1 Drawing Figure under inventor. The

CONTINUOUS PROCESS FOR SCRUBBING SULFUR DIOXIDE FROM A GAS STREAM

CROSS REFERENCES TO RELATED APPLICATIONS

This application is a continuation-in-part of my prior, copending application entitled "TREATING A WATER STREAM CONTAINING A WATER-SOLUBLE SULFITE COMPOUND" which was filed Feb. 9, 1970 and assigned Ser. No. 9,894 now U.S. Pat. No. 3,574,097.

The subject of the present invention is a novel, continuous process for the selective removal of $SO_2$ from a gas stream containing same. More precisely, the present invention involves an $SO_2$-scrubbing step operated with an aqueous absorbent containing an alkaline reagent coupled with a unique regeneration procedure which comprises: a preliminary treatment step wherein sulfite compound contained in the rich scrubbing solution are converted to the corresponding thiosulfate compound, a primary reduction step wherein the resulting thiosulfate compounds are converted to the corresponding sulfide compound, and a stripping step wherein the absorbent solution is regenerated with liberation of hydrogen sulfide. In one important aspect, the present invention has to do with a scrubbing process which is operated with highly efficient aqueous absorbent comprising ammonium hydroxide and/or carbonate wherein the rich scrubbing solution withdrawn from the scrubbing step contained ammonium sulfite and/or ammonium bisulfite, wherein the preliminary treatment step involves selective conversion of the ammonium sulfite and/or ammonium bisulfite to ammonium thiosulfate, wherein the primary reduction step involves selective conversion of ammonium thiosulfate to ammonium sulfide and/or hydrosulfide and wherein $H_2S$ is stripped from the resulting solution with $CO_2$ to form the regenerated absorbent.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., to produce flue or stack gas streams containing significant amounts of sulfur dioxide. Similarly, waste gas streams of this type are generally produced by other industrial processes such as the smelting of sulfur-bearing ores, the refining of coke, the production of sulfur in a Claus process, the production of paper via a wood pulping process and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A larger percentage of these proposed removal procedures involve contacting the sulfur dioxide containing gas stream with an aqueous absorbent stream which typically contain materials which chemically or physically react with the sulfur dioxide in order to absorb same into the liquid solution. A widely studied procedure involves the use of a solution of an alkaline reagent such as ammonium hydroxide or carbonate, one of the alkali or alkaline earth metal salts such as sodium hydroxide or carbonate, potassium hydroxide or carbonate and the like alkaline reagents, to produce a rich absorbent stream containing the corresponding sulfite and/or bisulfite compound. For example, the use of our aqueous absorbent containing sodium bicarbonate and carbonate to form a rich scrubbing solution containing sodium sulfite and bisulfite.

Although the simple concept of the scrubbing $SO_2$ from the gas stream containing same with an aqueous absorbent containing an alkaline reagent has many advantages associated with it such as simplicity, high effectiveness and versatility, wide spread adoption of this type of solution to the $SO_2$ pollution problem has been inhibited by the lack of a regeneration procedure for the rich absorbent stream which can continuously regenerate the rich absorbent stream by selectively and economically converting the absorbed $SO_2$ to a conveniently handled and saleable product in a highly selected manner. That is, it is required that the regeneration procedure enable the operation of the scrubbing system in a closed-loop scrubber with respect to the absorbent. In particular, it is required that an acceptable regeneration procedure have the capability of not only continuously producing a regenerated absorbent stream but also minimizing undesired by-products so as to prevent the buildup of undesired intractable, difficultly removed ingredients in the absorbent stream once the system is operated in a closed-loop fashion. The by-product that is of the greatest concern in this regard is sulfate — for example, in a system using an aqueous solution of ammonium hydroxide or ammonium carbonate as the absorbent, ammonium sulfate and bisulfate salts once formed in the system can present serious problems if special means are not provided to remove it or its production is not suppressed. Specifically, these salts can build up until finely divided solids are formed which then can cause corrosion, erosion and fouling problems.

One solution that has been proposed to the problem of regenerating the rich absorbent streams of the types discussed above is the use of the suitable reducing agent to react with the sulfite compounds contained therein in order to selectively produce elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing auto-oxidation-reduction at the conditions necssary for direct reduction.

The problem addressed by the present invention is, therefore, to provide a flue gas scrubbing system which is capable of continuous operation with a closed-loop absorbent circuit, which can selectively produce an easily removed substance as the principal product of the regeneration section and which can minimize the amount of undesired sulfate by-products formed in the regeneration section.

I have now found a combination process for continuously scrubbing $SO_2$ from a gas stream which utilizes a conventional aqueous absorbent stream in a closed-loop fashion and comprising a wet scrubbing step coupled with a novel regeneration procedure which enables the recovery of hydrogen sulfide in high yield, minimizes undesired sulfate by-products from the regeneration section and produces a regenerated absorbent stream which is of a relatively low total sulfur content and, consequently, possesses a high capacity for $SO_2$ removal. The concept of the present invention is based on my finding that the sulfite compound contained in the rich scrubbing solution withdrawn from the scrubbing step can be easily converted at relatively low severity conditions to the corresponding thiosulfate compound in the highly selective manner without forming any substantially amounts of undesired, intractable sulfate compounds. Coupled with the finding is my additional observation that the thiosulfate compound can be reduced by carbon monoxide in a highly selective, economic and efficient manner to form the corresponding sulfide compound from which hydrogen sulfide can be easily recovered. Thus the central point of the present process involves using a conventional scrubbing procedure coupled with a regeneration procedure wherein thiosulfate is used as an intermediate in a multi-step operation designed to convert the sulfite compound contained in the rich absorbent stream to hydrogen sulfide, rather than an attempt to directly reduce the sulfite compound to sulfide in a single step operation. This sulfite-to-thiosulfate-to-sulfide route provides a regeneration procedure which facilitates careful control of by-product formation during the regeneration operation and enables the production of a regenerated absorbent stream which can be directly recycled to the scrubbing step, thereby allowing the system to be operated in the closed loop fashion with respect to the absorbent stream.

It is accordingly, an object of the present invention to provide a simple, effective, efficient, and selective procedure for treating a gas stream containing $SO_2$ which process can selectively produce hydrogen sulfide and operate with a continuous closed-loop circuit of absorbent between the scrubbing section and the regeneration section. Another object is to minimize the amount of undesired, intractable by-products formed in the regeneration section of such a procedure. Another object is to provide a regeneration procedure for an $SO_2$-scrubbing step that maximizes the sulfur differential across the regeneration procedure, thereby increasing the capacity and efficiency of the regenerated absorbent.

In brief summary, one embodiment of the present invention is a process for treating an input gas stream containing $SO_2$ in order to continuously remove a substantial portion of the $SO_2$ therefrom. The first step is a scrubbing step wherein the input gas stream is contacted in a suitable liquid-gas contacting zone with an aqueous absorbent containing an alkaline reagent at scrubbing condition selected to result in a treated gas stream containing a substantially reduced amount of $SO_2$ and in an effluent water stream containing a water-soluble sulfite compound. The next step is a preliminary treatment step which involves contacting at least a portion of the effluent stream from the scrubbing step with a reducing agent, selected from the group consisting of finely divided sulfur, a polysulfide compound, a water-soluble sulfide compound and mixtures thereof, at thiosulfate production conditions selected to form an effluent stream containing a thiosulfate compound. Thereafter, the effluent stream from the preliminary treatment step is reacted with carbon monoxide in the primary reduction step at reduction conditions selected to produce a sulfide-containing aqueous effluent stream. The next step is a stripping step wherein hydrogen sulfide is stripped from the aqueous effluent stream from the primary reduction step to produce a hydrogen sulfide-containing overhead stream and regenerated aqueous absorbent stream. In the final step, at least a portion of the resulting regenerated aqueous absorbent stream is passed to the scrubbing step, thereby providing a closed-loop flow circuit of absorbent.

In another embodiment, the invention is a process as outlined about in the first embodiment wherein the alkaline reagent utilized in the aqueous absorbent stream is selected from the group consisting of the salts of ammonia, the alkali metals and the alkaline earth metals which hydrolize in water to form a basic solution — for example, the hydroxide and carbonate salts.

In a more specific embodiment, the present invention is a process for treating a gas stream containing $SO_2$ in order to remove a substantial portion of the $SO_2$ therefrom. The first step in this embodiment involves a scrubbing step in which the input gas stream is contacted with an aqueous absorbent containing ammonium carbonate or bicarbonate at scrubbing conditions selected to form a treated gas stream containing a substantially reduced amount of $SO_2$ and an effluent water stream containing ammonium sulfite or bisulfite. At least a portion of the effluent water stream from the scrubbing step is thereafter contacted in a preliminary treatment step, with a reducing agent, selected from the group consisting of finely divided sulfur, a polysulfide, a water-soluble sulfide compound and mixtures thereof, at thiosulfate production conditions selected to result in an effluent stream containing ammonium thiosulfate. The primary reduction step then involves reacting the effluent stream from the preliminary treatment step with carbon monoxide at reduction conditions selected to produce an aqueous effluent stream containing ammonium sulfide or hydrosulfide. The aqueous effluent stream from this primary reduction step is thereafter subjected to contact with a carbon dioxide-containing stripping gas at stripping conditions effective to produce a regenerated aqueous absorbent stream containing ammonium bicarbonate or carbonate and an overhead gaseous stream containing hydrogen sulfide. At least a portion of the resulting regenerated absorbent stream is then in the final step, passed to the scrubbing step, thereby providing a closed-loop flow circuit absorbent.

In another embodiment, the present invention is a process as described above in the last embodiment wherein the reducing agent utilized in the preliminary treatment step is hydrogen sulfide and wherein at least a portion of the overhead stream produced in the stripping step is passed to the preliminary treatment step in order to supply a portion of the hydrogen sulfide reactant utilized therein.

Yet another embodiment of the present invention involves a process as outlined above in the first embodiment wherein the primary reduction step is performed in the presence of a catalyst comprising a metallic component selected from the group consisting of the transition elements of groups VI and VIII of the Periodic Table, and compounds thereof, combined with a porous carrier material.

Other objects and embodiments of the present invention are hereinafter disclosed in the following detailed discussion of the input streams, the preferred conditions, the preferred reactants, the output streams and mechanics associated with each of the essential and preferred steps of the present invention.

The starting point for the subject process is a scrubbing step wherein an input gas stream containing $SO_2$ is contacted in a suitable gas-liquid contacting means with an aqueous absorbent containing an alkaline reagent. As previously explained, the input gas stream passed to this step is typically a flue or stack gas. For example, a typical stack gas stream containing about 1 to about 10% $O_2$, about 5 to 15 percent or more $CO_2$, about 3 to about 10 percent or more $H_2O$, about 0.01 to about 1 percent or more $SO_2$. In many cases, the input gas stream will also contain carbon monoxide, oxide of nitrogen, entrained fly ash and the other well-known ingredients for flue gas streams. The amount of $SO_2$ contained in this input gas stream can vary over a wide range; namely from about 0.01 to about 1 mole percent or more, with a more typical amount being about 0.05 to about 0.5 mole percent. In many cases, this input gas stream is available at a relatively high temperature of about 200° to about 500°F. or more, and since it is preferred that the temperature of the input gas stream be at a relatively low level because this increases the capacity of the absorbent solution, it is often advantageous to cool the input gas stream by any suitable means such as by presaturating it with water under adibatic conditions.

The aqueous absorbent utilized in this scrubbing step is generally characterized as an aqueous solution of a suitable alkaline reagent which reacts with water to give a basic solution such as ammonium hydroxide, ammonium carbonate and bicarbonate, the alkali metal hydroxides, the alkali metal carbonates and bicarbonates and the water-soluble alkaline earth metal hydroxide, carbonates and bicarbonates, and the like alkaline reagents. Of the alkali metal reagents, sodium hydroxide, sodium carbonate, sodium bicarbonate, potassium hydroxide, potassium carbonate, potassium bicarbonate are particularly preferred. In most cases, excellent results are obtained when the alkaline reagent is ammonium hydroxide or ammonium carbonate or ammonium bicarbonate. It is to be noted that it is within the purview of the present invention to use a mixture of the alkaline reagents previously mentioned. Since it is also contemplated that the scrubbing step can be operated with the absorbent continuously cycling around the scrubbing means, it is possible that absorbent could accumulate substantial amounts of sulfite and bisulfite compounds. In this last case, only a small portion of the rich effluent stream from the scrubbing step would be sent to the regeneration section of the process, and the major portion of the rich absorbent would be commingled with the regenerated absorbent stream and recycled to the scrubbing step.

The amount of alkaline reagent contained in the scrubbing solution is subject to some choice depending upon the specific requirements associated with the particular gas stream being treated; ordinarily, acceptable results are obtained when the alkaline reagent comprises about 1 to about 50 wt. percent of the absorbent solution, and more preferably to 1 to about 15 wt. percent. Of course, absorbent solutions containing an amount of the alkaline reagent up to the solubility limit of the particular alkaline reagent selected at the conditions maintained in the scrubbing step can be utilized if desired. In the case where the absorbent is continuously cycled around the scrubbing step and only a drag stream drawn off for regeneration, the total amount of the alkaline reagent contained in the solution (i.e. fresh and spent) can reach rather high levels; for example, it can easily constitute 30 to 50 wt. percent of the absorbent solutions.

This scrubbing step can be carried out in a conventional scrubbing zone in any suitable manner including multiple stages. The scrubbing solution can be passed into the scrubbing zone in either upward or downward flow and the input gas stream can be simultaneously introduced into the scrubbing zone in concurrent flow relative to the scrubbing solution. A particularly preferred procedure involves downward flow of the scrubbing solution with countercurrent flow of the gas stream which is to be treated. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich absorbent solution is withdrawn from the lower region thereof. For the class of alkaline reagents of concern here, the rich absorbent solution will contain substantial amounts of a water-soluble sulfite compound such as ammonium sulfite and/or bisulfite, sodium sulfite and/or bisulfite and the like. As indicated previously, according to one mode of operation of the scrubbing step, only a drag stream from the rich absorbent withdrawn from the step is sent to the regeneration section of the process; the rest is cycled around the scrubbing step. The drag stream is ordinarily withdrawn at a rate at least sufficient to continuously remove the net sulfur taken up in the scrubbing step.

This scrubbing step is generally conducted under conventional scrubbing conditions which are selected on the basis of the characteristics of the specific alkaline reagent utilized, the sulfur dioxide content of the input gas stream, the portion of the sulfur dioxide that is to be removed in the scrubbing step, and the physical properties of the scrubbing zone. Ordinarily, the scrubbing step is preferably operated at a relatively low temperature of about 10° to 100°C., a relatively low pressure which typically approximates atmospheric, a volume ratio of input gas streams to scrubbing solution of about 100:1 to about 10,000:1 and a pH of about 4 to 7 or more. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

Following the scrubbing step, the next step of the present process is the preliminary treatment step and it involves the conversion, in the highly selective manner, of the sulfite or bisulfite compound contained in at least a portion of the effluent water stream withdrawn from the scrubbing step, to the corresponding thiosulfate compound. Ordinarily the sulfite or bisulfite compound is contained in the feed stream to this step in an amount of about 0.01 wt. percent, calculated on an equivalent sulfur basis, up to the solubility limit of the particular sulfite compound in water at the conditions utilized in the scrubbing step; for example, the feed stream to this step can contain about 1 to about 20 wt. percent sulfur as ammonium sulfite and/or bisulfite. According to the present invention, this step involves a reaction between the sulfite compound contained in this rich absorbent stream and a special type of reducing agent. This reducing agent is selected from the group consisting of finely divided sulfur, a polysulfide compound, a water-soluble sulfide compound and mixtures thereof. In the first mode of operation of this step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into this step via a water stream containing a slurry of finely divided sulfur in an amount of about 1 to about 75 wt. percent thereof, although many other suitable means for injecting finely divided solid particles can be utilized if desired. In this first mode of operation, it is preferred to also utilize a wetting agent in the reaction mixture in order to facilitate good contact of the elemental sulfur with the sulfite compound. Suitable wetting agents are: the salts of alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this first mode of operation of the first step should be sufficient to supply one atom of sulfur per molecule of sulfite compound contained in the input water stream, with the preferred amount corresponding to about one to about three atoms of sulfur per mole of sulfite compound.

In a second mode of operation for this preliminary treatment step, the reducing agent is a polysulfide compound. Suitable polysulfide compounds include the ammonium, alkali metal, and alkaline earth polysulfides. Best results are ordinarily obtained with ammonium or sodium polysulfide. The polysulfide compound is ordinarily charged to this first step in the form of an aqueous solution containing about 1 to about 50 wt. percent of the polysulfide compound. It is to be noted that when the reducing agent is a polysulfide compound, no wetting agent is necessary in order to achieve good contact with the sulfite compound. The amount of the polysulfide compound charged to this step is preferably sufficient to provide at least the stoichiometric amount necessary for the reaction between it and the sulfite compound to produce the corresponding thiosulfate compound. In the typical case where the polysulfite compound contains four atoms of elemental sulfur and one atom of sulfide (e.g. $(NH_4)_2S_5$), the stoichiometric amount is 1/6 moles of polysulfide per mole of sulfite compound, with a preferred value being about one-fourth to about three-fourths or more moles of polysulfide per mole of sulfite compound.

In a third mode of operation of this preliminary treatment step, the reducing agent is a water-soluble sulfide compound. Suitable water-soluble sulfide compounds are hydorgen sulfide, ammonium sulfide, ammonium hydrosulfide and the sulfides and hydrosulfides salts of the alkali and alkaline earth metals. Best results are ordinarily obtained in this mode of operation of this step when the sulfide reactant is hydrogen sulfide or ammonium hydrosulfide. The amount of this sulfide reactant utilized in this step is at least sufficient to provide 0.5 moles of sulfide compound per mole of sulfite compound contained in the input water stream, with best results obtained at a mole ratio corresponding to about 0.6 to about 1.5 or more. Likewise, in this third mode of operation, good results are ordinarily obtained when the pH of the input water stream is in the range of 4 to about 7.

Conditions utilized in this preliminary treatment step can be generally described as thiosulfate production conditions and comprise: a temperature of about 20 to about 150°C., a pressure sufficient to maintain the input water stream in the liquid phase and a contact time corresponding to about 0.05 to 1 or more hours. In general, the contact time necessary for the desired reaction is a function of the reducing agent utilized, with relatively short contact times of about 1 to 5 minutes being sufficient in the case where the reducing agent is a sulfide or a polysulfide compound. The other two reducing agents require a relatively longer contact time ranging up to about 0.1 to about 1 hour. Considering all of the factors involved in the operation of this preliminary treatment step, best results are ordinarily obtained when the reducing agent is hydrogen sulfide or a polysulfide compound, particularly sodium or ammonium polysulfide.

Following this preliminary treatment step, an aqueous effluent stream containing relatively large amounts of a thiosulfate compound is withdrawn therefrom and passed to tbe primary reduction step of the present process wherein thiosulfate is reacted with carbon monoxide at reduction conditions selected to produce the corresponding sulfide compound.

The carbon monoxide stream for use herein may be obtained from any suitable source or may be prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain metals at high temperatures. For example, a gas stream containing about 40 percent carbon monoxide is easily prepared by blowing steam through a bed of coal at an elevated temperature. Another suitable carbon monoxide-containing stream is obtained by simultaneously blowing air and steam through a bed of red hot coal to produce a gas stream containing about 30 percent carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000°C. in order to decompose the $CO_2$ to CO. Regardless of the source of the carbon monoxide, it is preferably used herein in an amount sufficient to provide a mole ratio of carbon monoxide to thiosulfate compound of at least 4:1, with best results obtained at a mole ratio of about 5:1 to 10:1 or more. I have observed that the amount of sulfide formed increases with higher mole ratios of carbon monoxide to thiosulfate.

This primary reduction step can be carried out, if desired, without the use of a catalyst; however, in many cases, it is advantageous to use a catalyst for this reaction. Based on my investigations I have determined that improved results are obtained in this step when the reaction zone contains materials such as particles of charcoal, and particles of activated carbon. Particularly good results are obtained with a catalyst comprising a metallic component selected from the group consisting of the transition metals of groups VI and VIII such as chromium, molybdenum, tungsten, iron, cobalt, nickel, platinum, palladium, etc. From this, I have concluded that preferred catalysts for the desired reduction reaction comprise a combination of a group VI or a group VIII transition metal component with a suitable porous support such as alumina or activated carbon. Particularly preferred embodiments of the present step involve the use of catalysts in which the metallic component is present in the form of a metallic sulfide such as cobalt sulfide, or molybdenum sulfide, or tungsten sulfide combined with a carrier material. The preferred carrier materials are activated carbons such as those commercially available under the trade names of Norite, Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt or molybdenum or tungsten sulfide combined with relatively small particles of activated carbon. Excellent results have been obtained with 10 to 12 mesh activated carbon particles containing about 5 wt. percent of cobalt sulfide. In general, the amount of the metallic component utilized in the catalyst should be sufficient to comprise about 0.1 to about 50 percent thereof, calculated on a metallic sulfide basis. These catalysts can be prepared according to any of the conventional procedures for combining a metallic component with a carrier material, with an impregnation procedure with a soluble, decomposable compound of the desired group VI or VIII transition metal ordinarily giving best results.

This primary reduction step can be carried out in a conventional reaction zone in any suitable manner. The thiosulfate-containing effluent stream from the preliminary treatment step can be passed into the reaction zone in either upward, radial or downward flow and the carbon monoxide stream can be simultaneously introduced into the reaction zone in either countercurrent or concurrent flow relative to the thiosulfate-containing effluent stream. In particular, a preferred embodiment of this step involves downward flow of the thiosulfate stream with countercurrent flow of the carbon monoxide stream. It is preferred to utilize suitable means in the reaction zone for effecting intimate contact between a liquid stream and a gas stream. Suitable contacting means include bubble trays, baffles and any of the various packing materials known to those skilled in the art. In the preferred case where a catalyst is utilized in this second step, best results are ordinarily obtained when the catalyst is maintained within the reaction zone as a fixed bed of relatively small particles. These catalyst particles perform the dual functions of catalyzing the desired reaction and of promoting intimate contact between the gas and liquid streams. In the preferred countercurrent flow mode of operation for this step, a gas stream containing carbon dioxide, unreacted carbon monoxide and some hydrogen sulfide is typically withdrawn from the upper region of the reaction zone. Likewise, an aqueous effluent stream containing the corresponding sulfide compound is withdrawn from the lower region of the reaction zone. For example, in the case where the input stream to this primary reduction step contains ammonium thiosulfate, this aqueous effluent stream will primarily contain ammonium hydrosulfide with minor amounts of unreacted ammonium thiosulfate, ammonium carbonate and ammonium hydroxide.

The reduction conditions utilized in this primary reduction step are typically relatively more severe than those utilized in the preliminary treatment step and can be generally characterized as reduction conditions sufficient to effect conversion of thiosulfate to sulfide. The temperature is preferably selected from the range of about 100° to about 350°C., with best results obtained at a relatively high temperature of about 150° to about 350°C. It is an essential feature of the present invention that the step is conducted under liquid phase conditions; accordingly, the pressure employed must be sufficient to maintain at least a portion of the effluent stream from the first step in the liquid phase. Typically the pressure is selected from the range of about 100 to about 3,000 psig., as a function of the reaction temperature in order to maintain the desired liquid phase condition. Particularly good results are obtained at a temperature of about 200°C., and a pressure of about 500 psig. It is preferred to use a liquid hourly space velocity (defined on the basis of the liquid volume charge rate of the effluent stream from the first step divided by the volume of the reaction zone utilized in this second step in the case where a catalyst is not utilized and by the volume of the catalyst bed in the case where a catalyst is used in this second step) selected from the range of about 0.25 to about 10 hr.$^{-1}$, with best results obtained at about 0.5 to about 3 hr.$^{-1}$. Excellent results have been obtained in this step with a LHSV of 1 hr.$^{-1}$.

In the next step of the present invention the aqueous effluent stream recovered from the primary reduction step is subjected to a stripping step designed to liberate hydrogen sulfide therefrom. Although any suitable stripping gas can be utilized including steam, nitrogen, air and the like, carbon dioxide is particularly preferred, because it acts to decrease the pH of the solution and form the corresponding carbonate salt. For instance in the case where the effluent stream from the primary reduction step contains ammonium hydrosulfide, stripping with carbon dioxide liberates hydrogen sulfide and produces ammonium carbonate. In another mode of operation of this step, the effluent water stream from the primary reduction step can be subjected to conditions sufficient to decompose the sulfide compound contained in this stream. For example, in the typical case where this water stream contains ammonium hydrosulfide, acceptable decomposition conditions are a temperature of about 100° to 200°C., and a pressure of about 1 to about 75 psig. Typically this decomposition mode of operation is contacted in a conventional distillation zone wherein upflowing vapors are generated by supplying heat to the bottom of same by means such as a steam coil or conventional reboiler. Regardless of which mode of operation is employed in this third step, an overhead stream containing hydrogen sulfide will be produced. Likewise, a regenerated aqueous absorbent stream which is substantially reduced in total sulfur content will be recovered therefrom as a bottom stream.

As indicated, this regenerated aqueous absorbent stream is substantially reduced in total sulfur content relative to the input rich absorbent stream and usually will contain less than 10 percent of the amount of sulfur contained in the input absorbent stream. In the case where the carbon dioxide is utilized in the stripping step as the stripping medium, this treated water stream will contain substantial amounts of the carbonate or bicarbonate salt of the alkaline reagent originally present in the input absorbent stream — for example in the case where the alkaline reagent is ammonia, the regenerated absorbent stream will contain ammonium carbonate and/or bicarbonate, and in the case where the alkaline reagent is sodium hydroxide or carbonate the treated water stream will contain sodium carbonate and/or bicarbonate.

In accordance with the instant process, at least a portion of the regenerated absorbent stream is passed to the scrubbing step. In a preferred embodiment of the instant process, a portion of the hydrogen sulfide-containing overhead stream produced in the stripping step is passed to the preliminary treatment step in order to supply at least a portion of the reducing agent used therein. The remaining portion of this hydrogen sulfide-containing stream is then recovered as one of the product streams from the instant process. The hydrogen sulfide contained in this product stream can be converted to elemental sulfur by any suitable oxidation procedure such as a conventional Claus process or to sulfuric acid or used per se.

Having broadly characterized the essential steps comprising the present process, reference is now made to the attached drawing for a detailed explanation of a working example of a preferred flow scheme for the present invention. The attached drawing is merely intended as a general representation of the flow scheme involved with no intention to give details about heaters, pumps, valves and the like equipment except where a knowledge of these devices is essential to an understanding of the present invention or would not be self-evident to those skilled in the relevant art.

Referring now to the attached drawing, a flue gas stream enters the system via line 1 and is passed into the lower region of a conventional liquid-gas scrubbing means, zone 2. In this zone it is passed in countercurrent flow to a descending stream of absorbent solution which enters the upper region of zone 2 via line 4. The input gas stream contains about 5% $O_2$, 12% $CO_2$, 6% $H_2O$, 76.8% $N_2$ and 0.2% $SO_2$. Zone 2 is a conventional-gas liquid contacting zone fitted with conventional means such as baffles, trays, packing material and the like, for effecting intimate contact between an ascending gas stream and a descending liquid stream.

Also introduced into zone 2 is a liquid stream comprising the aqueous absorbent solution. It enters zone 2 via line 4 and is made up of two separate streams, one of which is a regenerated absorbent stream obtained from the regeneration section of the present system and the second of which is a major portion of the rich absorbent stream withdrawn from the lower region of zone 2 via line 4. The alkaline reagent utilized in this absorbent stream is primarily ammonium carbonate with a minor amount of ammonium bicarbonate.

According to the mode of operation of zone 2 shown in the drawing, the rich absorbent stream is withdrawn from the bottom of zone 2 via line 4 and a major portion of this stream is continuously cycled around zone 2 in order to allow the concentration of sulfite salts in the absorbent stream to build to relatively high levels. This procedure increases the capacity of the absorbent and minimizes the amount of the absorbent stream that must by cycled through the regeneration section of the system. The absorbent stream introduced into scrubber 2 via line 4 will accordingly contain a substantial amount of sulfite salts along with the alkaline reagent. Ordinarily, zone 2 is operated by monitoring the pH of the absorbent stream at the inlet to zone 2 and controlling the amount of the rich absorbent stream diverted to the regeneration section of the system at the junction of line 4 and 5 in response to a decrease in pH level. The preferred pH range is about four to about seven or more, with best results ordinarily obtained in the range of about five to seven. With the system operating so that the absorbent stream introduced into zone 2 via line 4 is maintained at a pH level within this range, the rich absorbent stream withdrawn continuously from zone 2 via line 4 can typically contain about 1 to about 15 or more wt. percent sulfur principally as a mixture of ammonium sulfite and ammonium bisulfite. In addition, minor amounts of ammonium sulfate and thiosulfate are formed in zone 2. In the particular case shown in the drawing, the rich absorbent preferably contains about 8 wt. percent sulfur as ammonium sulfite and bisulfite.

Zone 2 is operated at a temperature of about 50°C., a pressure of about atmospheric and a gas to absorbent volume ratio of about 500:1. At these conditions, the treated gas stream withdrawn from the upper region of zone 2 via line 3 is found to contain less than 5 percent of the $SO_2$ originally present in the input gas stream.

As previously explained, the rich absorbent stream withdrawn from the lower region of zone 2 via line 4 is divided into two portions at the junction of line 5 with line 4. The major portion continues on via line 4 and is admixed with regenerated absorbent at the junction of line 15 with line 4. The resulting mixture of cycled and regenerated absorbent is then reintroduced into zone 2 via line 4. The minor portion of the rich absorbent is passed via line 5 into the first reacting zone, zone 6. The amount of rich absorbent passed into zone 6 is ordinarily at least sufficient to remove the net sulfur input into zone 2 from the input gas stream in order to line out the concentration of sulfur in the absorbent stream. In the case under consideration, the amount of the absorbent withdrawn for regeneration via line 5 will be about 0.1 to 10 percent of the rich absorbent stream withdrawn from the bottom of zone 2. It is to be noted that during start up of scrubbing zone 2, the inventory of the scrubbing solution needed for initiating operation is introduced into the system via line 19, 15 and 4. It is also to be recognized that there is a net water make in the regeneration of the absorbent which ordinarily is removed from the system in the treated gas stream withdrawn from the system via line 3.

The rich absorbent stream introduced into zone 6 via line 5 in the particular case of interest here contains about 8 wt. percent sulfur as a mixture of ammonium sulfite and ammonium bisulfite. It enters the upper region of zone 6 which, once again, is a conventional liquid-gas contacting zone designed to effect intimate contact with an ascending gas stream and a descending liquid stream. Also, introduced into zone 6 via line 14 is a gas stream containing hydrogen sulfide. During start-up of zone 6 sufficient $H_2S$ is introduced thereto via lines 18 and 4 to initiate the desired conversion reaction. Thereafter a portion of the hydrogen sulfide-containing gas stream which is produced in the subsequently described stripping step is passed to zone 6 from zone 13 via line 14. In either case the amount of hydrogen sulfide supplied to zone 6 is sufficient to react about 0.5 moles of $H_2S$ per mole of ammonium sulfite plus ammonium bisulfite charged to zone 6. By conventional means zone 6 is maintained at a temperature of 100°C. at a pressure of 200 psig. Also the flow rates of the stream into zone 6 are adjusted to provide a residence time of the liquid stream in zone 6 of about 0.5 hours.

An overhead gaseous stream, containing unreacted hydrogen sulfide and minor amounts of carbon dioxide and carbon monoxide, is then withdrawn from zone 6 via line 7 and vented from the system. Likewise, an aqueous effluent stream is withdrawn from the lower region of zone 6 via line 8 and charged to the second reaction zone, zone 9. This aqueous effluent stream contains ammonium thiosulfate in an amount corresponding to a conversion in zone 6 of greater than 90 percent of the input ammonium sulfite and bisulfite to ammonium thiosulfate. Furthermore, the amount of undesired ammonium sulfate formed by the reaction in zone 6 is less than 3 percent of the input sulfite. Accordingly, the aqueous effluent stream withdrawn from zone 6 via line 8 principally contains ammonium thiosulfate with minor amounts of unreacted ammonium sulfite and bisulfite.

Zone 9, the second reaction zone, is another liquid-gas reaction zone designed to effect intimate contact between an ascending gas stream and a descending liquid stream. The aqueous effluent stream from zone 6 is introduced into the into the upper region of zone 9 by means of line 8. Likewise, a carbon monoxide-rich stream is introduced into the lower region of zone 9 by means of line 11. Zone 9 contains a fixed bed of a catalyst comprising 10 to 12 mesh particles of activate carbon having a cobalt sulfide component combined therewith in an amount sufficient to result in a catalyst containing about 5 wt. percent cobalt. The amount of carbon monoxide introduced into the system via line 11 corresponds to a carbon monoxide to ammonium thiosulfate mole ratio of about 5.5:1. The reduction conditions maintained in zone 9 by conventional means are a temperature of about 200°C., a pressure about 500 psig. and a liquid hourly space velocity of 1 hr.$^{-1}$.

A sulfide-containing aqueous effluent stream is then withdrawn from the lower region of zone 9 via line 12 and passed to stripping zone 13. An overhead gaseous stream is similarly withdrawn from the upper region of zone 9 via line 10 and passed to the lower region to the stripping zone 13. An analysis of the stream flowing through line 12 indicates that 99 percent of the ammonium thiosulfate charged to zone 9 is converted therein to ammonium hydrosulfide. A similar analysis of the overhead gas stream indicates that it contains a relatively large amount of carbon dioxide with minor amounts of unreacted carbon monoxide, hydrogen sulfide, ammonia and water. At the junction of line 10 with line 16 additional quantities of $CO_2$ may be added to the system in order to increase the efficiency of the stripping operation in zone 13. In many cases the amount of $CO_2$ contained in the overhead stream from zone 9 is sufficient for the stripping step and the addition of $CO_2$ via line 16 is not necessary.

In stripping zone 13, the aqueous effluent stream from zone 9 is countercurrently contacted with an ascending gaseous stream which essentially comprises the overhead gaseous stream fron zone 9. Zone 13 is typically operated at a relatively low temperature and pressure as compared to zone 9. In fact excellent results are obtained at a temperature of about 70°C. and atmospheric pressure. Although excellent results can be obtained by stripping at relatively low temperatures, it is, of course, advantageous to use conventional means such as a stream coil or reboiler to heat the liquid in the bottom portion of zone 13 in order to further generate up-flowing vapors which aid in the liberation of $H_2S$.

An overhead gaseous stream is then withdrawn from zone 13 via line 14 and passed to the junction of line 17 with line 14. The major portion of this overhead stream is then withdrawn from the system via line 17. The gas stream withdrawn via line 17 contains the net sulfide product of the present process and, it can be charged to any suitable process for the recovery of sulfur or the manufacture of sulfuric acid if desired; for example, this stream could be passed to a conventional Claus unit for recovery of sulfur via an oxidation procedure. This overhead gaseous stream contains a relatively large amount of hydrogen sulfide, carbon dioxide and minor amounts of carbon monoxide, ammonia and water. Another portion of this overhead stream is passed via line 14 to zone 6 in order to supply the hydrogen sulfide reactant necessary for the conversion of sulfite to thiosulfate in zone 6.

A stream of regenerated absorbent is withdrawn from the lower region of zone 13 via line 15 and passed back to zone 2 via line 4. This regenerated absorbent stream primarily contains a mixture of ammonium carbonate and bicarbonate with minor amounts of unreacted ammonium thiosulfate, unreacted ammonium sulfite, ammonium hydrosulfide and ammonium sulfate. The total sulfur content of this regenerated absorbent stream is less than 10 percent of the total sulfur content of the rich absorbent stream withdrawn from the scrubbing section of the system via line 5. Moreover, the amount of undesired ammonium sulfate formed in the regeneration section of the system (i.e., the section of the system comprising zones 6, 9, and 13) is less than 3 percent of the sulfite charged to the regeneration section via line 5. Thus the scrubbing process of the present invention enables the continuous scrubbing of $SO_2$ from the gas stream entering the system via line 1 with continuous regeneration and recirculation of absorbent in a closed-loop manner. In addition, the amount of undesired ammonium sulfate formed in the regeneration section of the system is held to extremely low levels.

It is intended to cover by the following examples all changes and modifications of the above disclosure of the present invention that would be self-evident to a man of ordinary skill in the gas treating art.

I claim as my invention:

1. A process for treating an input gas stream containing $SO_2$ in order to continuously remove $SO_2$ therefrom, said process comprising the steps of:
   a. contacting the input gas stream with an aqueous absorbent containing an alkaline reagent at scrubbing conditions selected to result in a treated gas stream containing a reduced amount of $SO_2$ and in an effluent water stream containing a water-soluble sulfite compound;
   b. contacting at least a portion of the effluent stream from step (a) with a reducing agent, selected from the group consisting of finely divided sulfur, a polysulfide compound, a water-soluble sulfide compound and mixtures thereof, at thiosulfate production conditions selected to form an effluent stream containing a thiosulfate compound;
   c. reacting the effluent stream from step (b) with carbon monoxide at reduction conditions selected to produce a sulfide-containing aqueous effluent stream;
   d. stripping hydrogen sulfide from the aqueous effluent stream from step (c) to produce a regenerated aqueous absorbent stream; and thereafter,
   e. passing at least a portion of the resulting regenerated aqueous absorbent stream to step (a).

2. A process as defined in claim 1 wherein the alkaline reagent utilized in the absorbent is ammonium carbonate.

3. A process as defined in claim 1 wherein the alkaline reagent utilized in the absorbent is ammonium hydroxide.

4. A process as defined in claim 1 wherein the alkaline reagent utilized in the absorbent is an alkali metal hydroxide or carbonate.

5. A process as defined in claim 4 wherein said alkali metal is sodium.

6. A process as defined in claim 4 wherein said alkali metal is potassium.

7. A process as defined in claim 1 wherein said alkaline reagent utilized in the absorbent stream is an alkaline earth metal hydroxide or carbonate.

8. A process as defined in claim 1 wherein the thiosulfate production conditions utilized in step (b) include a temperature of about 20° to about 150° C. and a pressure sufficient to maintain the effluent stream from step (a) in the liquid phase.

9. A process as defined in claim 1 wherein the reduction conditions utilized in step (c) include a temperature of about 100° to about 350° C. and a pressure sufficient to maintain the effluent stream from step (b) in the liquid phase.

10. A process as defined in claim 1 wherein the amount of carbon monoxide charged to step (c) is sufficient to provide a mole ratio of carbon monoxide to thiosulfate of at least 4:1.

11. A process as defined in claim 1 wherein the reducing agent utilized in step (b) is hydrogen sulfide.

12. A process as defined in claim 11 wherein at least a portion of the hydrogen sulfide utilized in step (b) is obtained by passing to step (b) a portion of the hydrogen sulfide stripped in step (d).

13. A process as defined in claim 1 wherein the reducing agent utilized in step (b) is finely divided sulfur which is used in an amount at least sufficient to provide a mole ratio of sulfur to sulfite of 1:1.

14. A process as defined in claim 1 wherein the reducing agent utilized in step (b) is a polysulfide compound which is used in an amount at least sufficient to provide a mole ratio of polysulfide to sulfite of 1:6.

15. A process as defined in claim 1 wherein the reducing agent utilized in step (b) is a water-soluble sulfide compound which is used in an amount at least sufficient to provide a mole ratio of sulfide to sulfite of 1:2.

16. A process as defined in claim 1 wherein step (c) is performed in the presence of the catalyst comprising activated carbon.

17. A process as defined in claim 1 wherein step (c) is performed in the presence of a catalyst comprising a metallic component selected from the group consisting of the transition metals of groups VI AND VIII of the Periodic Table combined with a porous carrier material.

18. A process as defined in claim 17 wherein the catalyst is cobalt sulfide combined with activated carbon or alumina.

19. A process for treating an input gas stream containing $SO_2$ in order to continuously remove $SO_2$ therefrom, said process comprising the steps of:

a. contacting the input gas stream with an aqueous absorbent containing ammonium carbonate or bicarbonate at scrubbing conditions selected to form a treated gas stream containing a reduced amount of $SO_2$ and an effluent water stream containing ammonium sulfite or bisulfite;

b. contacting at least a portion of the effluent water stream from step (a) with a reducing agent, selected from the group consisting of finely divided sulfur, a polysulfide compound, a water-soluble sulfide compound and mixtures thereof, at thiosulfate production conditions selected to result in an effluent stream containing ammonium thiosulfate;

c. reacting the effluent stream from step (b) with carbon monoxide at reduction conditions selected to produce an aqueous effluent stream containing ammonium sulfide or hydrosulfide;

d. stripping hydrogen sulfide from the aqueous effluent stream from step (c) with a carbon dioxide-containing stripping gas to form a regenerated aqueous absorbent stream containing ammonium bicarbonate or carbonate and an overhead gaseous stream containing hydrogen sulfide; and thereafter, e. passing at least a portion of the resulting regenerated absorbent stream back to step (a).

20. A process as defined in claim 19 wherein the reducing agent utilized in step (b) is hydrogen sulfide.

21. A process as defined in claim 20 wherein at least a portion of the hydrogen sulfide reactant utilized in step (b) is obtained by passing a portion of the overhead stream produced in step (d) to step (b).

* * * * *